(12) United States Patent  (10) Patent No.: US 7,987,125 B2
Roberts                    (45) Date of Patent:     Jul. 26, 2011

(54) SYSTEM AND METHOD FOR SPECIAL ACCOUNTS

(75) Inventor: Michael F. Roberts, Palm Harbor, FL (US)

(73) Assignee: Catalina Marketing Corporation, St. Petersburg, FL (US)

( * ) Notice: Subject to any disclaimer, the term of this patent is extended or adjusted under 35 U.S.C. 154(b) by 614 days.

(21) Appl. No.: 11/538,181

(22) Filed: Oct. 3, 2006

(65) Prior Publication Data

US 2007/0083449 A1    Apr. 12, 2007

Related U.S. Application Data

(60) Provisional application No. 60/723,920, filed on Oct. 6, 2005.

(51) Int. Cl.
G06Q 40/00        (2006.01)
(52) U.S. Cl. .................................. 705/35; 705/2; 705/14
(58) Field of Classification Search ................ 705/2, 14, 705/35
See application file for complete search history.

(56) References Cited

U.S. PATENT DOCUMENTS

| 6,070,153 | A | 5/2000 | Simpson |
| 6,105,865 | A | 8/2000 | Hardesty |
| 6,208,973 | B1 | 3/2001 | Boyer et al. |
| 6,311,170 | B1 | 10/2001 | Embrey |
| 6,453,297 | B1 | 9/2002 | Burkes et al. |
| 6,631,358 | B1 | 10/2003 | Ogilvie |
| 2002/0035529 | A1 | 3/2002 | Tooke |
| 2003/0074311 | A1 | 4/2003 | Saylors et al. |
| 2004/0249745 | A1 | 12/2004 | Baaren |
| 2005/0015280 | A1 | 1/2005 | Gabel et al. |
| 2005/0027652 | A1 | 2/2005 | Reeves et al. |
| 2005/0038740 | A1 | 2/2005 | Ogilvie |
| 2006/0149595 | A1* | 7/2006 | Williams et al. ................... 705/2 |
| 2006/0167720 | A1* | 7/2006 | Harrison et al. ................... 705/2 |

* cited by examiner

*Primary Examiner* — Ojo O Oyebisi
(74) *Attorney, Agent, or Firm* — Neifeld IP Law, PC (57) ABSTRACT

This invention provides methods and system for facilitating funding, disbursing, and accessing consumer tax preferential accounts wherein funding or disbursing is related to consumers POS transactions. Novel network computer systems and methods of their include a POS CS and a central CS. The central CS receives consumer purchase transaction data records from the POS CS. The central CS stores consumer data that may include consumer purchase transaction data records, sponsor accounts including at least one HSA sponsor account, and HSA accounts. The central CS applies funding and/or disbursing criteria to fund and/or disburse funds based upon consumer data records.

39 Claims, 5 Drawing Sheets

FIG. 5

SYSTEM AND METHOD FOR SPECIAL ACCOUNTS

CROSS REFERENCE TO RELATED APPLICATIONS

This application claims priority to U.S. provisional application 60/723,920, filed Oct. 6, 2005, titled "System and Method for Special Accounts".

FIELD OF THE INVENTION

This invention relates generally to a system and method for funding and dispersing funds from accounts having some special tax status, such as to health savings accounts.

BACKGROUND ART

HSA is an acronym for Health Savings Account.

A HSA is a trust account having preferential tax treatment. A HSA is an account having as beneficiary a real person, and a trustee other than the consumer. Funds in an HSA receive preferential tax treatment. Use of funds in the consumer's HSA to pay certain consumer's medical costs may also obtain preferential tax status. Preferential tax status means less or no tax (of any type, such as income, value added, or sales) on the consumer result from payment by funds in the consumer's HSA. An HSA account must be managed held by trustee (a legal entity) other than the consumer. Statute authorizes banks, credit unions, insurance companies, and a consumer's employer to be an HSA trustee for consumers HSAs. However, the consumer beneficiary may specify to the trustee how to invest and dispense funds in the consumer's HSA. For example, the consumer may instruct the trustee to pay the consumer's medical expenses from the HSA.

HDHP is an acronym for High Deductible Health Plan. Under current U.S. law, a consumer is only entitled to an HSA if the consumer has a qualifying HDHP, that is, an HDHP that meets the requirements for the consumer to also have a HSA. Under current U.S. law, a consumer's HSA can only pay for expenses and payments for medical costs for the consumer not otherwise covered by the consumer's qualifying HDHP qualify for tax preferential treatment.

U.S. Pat. No. 6,631,358 to Ogilvie teaches providing tools and techniques for directing funds on behalf of a consumer to a specified account as a beneficial side-effect of a purchase of merchandise or services.

U.S. Pat. No. 6,105,865 to Hardesty teaches a rebate program for the benefit of participating individuals such as wage earners. Hardesty teaches that participating individuals apply and are approved and are issued a card with an identifiable account number using credit approval systems. Hardesty's card may include debit, smart, consumer loyalty, and security features. Hardesty discloses calculating and transferring a rebate to the participant's account in a trust fund.

United States patent publication 20020035529 to Tooke teaches systems and techniques for managing resources for a health care consumer by inserting taxable resources into a health savings account, inserting nontaxable resources into the HSA, and enabling the health care consumer to access the health savings account to reimburse a health care provider.

The teachings of Oglivie, Hardesty, and Tooke are incorporated herein by reference.

SUMMARY OF THE INVENTION

Definitions

Certain terms used in this application are defined below. In addition, some examples of some definitions are provided to clarify the definitions. Description of the novel systems and methods continues after the definitions.

Acronyms

HSA is an acronym for Health Savings Account.

HDHP is an acronym for High Deductible Health Plan.

NDC is an acronym for National Drug Code.

UPC is an acronym for Universal Product Code.

CID is an acronym for Consumer IDentification.

PID is an acronym for Patient IDentification.

POS is an acronym for Point Of Sale.

CS is an acronym for Computer System.

QME is an acronym for Qualified Medical Expense.

Entities

Sponsor, in this application, means a legal entity that is liable for the costs of donations, rewards, or redemption of purchase incentives.

HSA Sponsor, in this application, means a legal entity that is liable for the costs of HSA donations. For example, a HSA Sponsor may be a pharmaceutical company, medical supplies vendor, package good manufacturer (including a pharmaceutical company), distributor (including a medical supplies vendor), retailer, and a consumer's employer.

HSA trustee, in this application, refers to a legal entity that manages in an HSA for a consumer. For example, a HSA trustee may be a consumer's employer, a bank, or an HDHP medical insurer.

Consumer, customer, and individual, are synonymous in this application. Those terms describe an individual.

Medical insurer, in this application, refers to a company providing any medical insurance entitling a consumer to a corresponding HSA.

HDHP medical insurer, in this application, refers to a company providing HDHP medical insurance entitling a consumer to a corresponding HSA.

Identifiers

A CID, and a PID, in this application, means any identifier that can be scanned, read, or otherwise entered into a CS or terminal to identify a consumer.

For example, a CID may be an HSA account number, debit, credit, insurance, pharmacy, or social security card number, driver's license or vehicle license plate number, checking account number, street addresses, names, e-mail addresses, telephone number, frequent shopper card number. CID includes biometric identifiers, such as finger print, face pattern, and retinal pattern data. A CID may be stored in human and/or machine readable form on any medium.

A product code, in this application, is a code associated with a product. A product code may be a code assigned by a company, a retail store, a pharmacy, or by an industry standard, such as National Drug Code (NDC) or Universal Product Code (UPC), to a product.

An HSA identifier is a unique identifier for a consumer's HSA. An HSA identifier is also a CID. A CID may be a consumer's HSA identifier.

An NDC is an identifier that identifies a drug product.

For example, an NDC may be a unique 10-digit, 3-segment number that identifies the labeler/vendor, product, and trade package size. Each drug product listed under Section 510 of the Federal Food, Drug, and Cosmetic Act is assigned such a code.

Exchanges

Transaction, in this application, means a single exchange involving at least two legal entities.

Consumer transaction, in this application, means a single exchange involving at least two legal entities one of which is a consumer.

Consumer purchase transaction, in this application, means a single transaction involving transfer of ownership or rights to a product or service to a consumer in exchange for payment via currency or credit, such as payment via cash, check, credit card, debit card, smart card, gift card, credit slip.

Tax favored or preferential means a having partial or entirely tax deferred, tax preferential, or tax free status.

Donation, in this application, means the transfer of money from the account of one entity to an account of another entity without any financial compensation.

Purchase incentive, in this application, means a reward contingent upon the purchase of a specified thing, wherein the reward is other than the thing.

Purchase incentive offer is an offer of the reward contingent upon the purchase of a specified thing.

QME is consumer expense that, when paid from the consumer's HSA, results in preferential tax treatment for the consumer compared to payment from the consumer's non-trust account funds. For example, funds given to a consumer via funding the consumer's HSA, up to a certain amount of funds added annually, result in no income tax to the consumer. HSA funds disbursed for payment of costs for purchasing QMEs currently result in no income tax to the consumer.

Data and Information

Demographic data, in this application, means statistical data regarding the demographics of people. For example demographics data includes age, profession, gender, race, ethnicity, education level, marital status, information involving family size, number and age of children, pet ownership, hobbies, and household income.

Medical data, in this application, means data regarding a medicine, such as national drug code, type of medicine, description of medicine, size of dosage, pharmacy identification, physician information, and insurance coverage information.

Transaction data, in this application, means data relating to a transaction.

Consumer transaction data, in this application, means data relating to a consumer's transaction.

Consumer purchase transaction data, in this application, means data relating to a consumer's transaction involving purchase by the consumer of at least one of product and a service. For example, consumer purchase transaction data may include: CID or HSA identifier; a one or more product or service identifiers such as UPCs or NDCs; product descriptions (including drug and other medical products' descriptions); associated product list prices; associated product actually paid prices; associated product discounts; associated number of product items; date and time; POS identifier; clerk identifier; total, amount tendered; amount of change; credit card identification; consumer name; consumer identification; consumer biometric data (fingerprint, retinal or facial scan, voice data, or the like); transaction ID or consumer purchase transaction ID; location of purchase; brand of medication; type of medication; amount of a consumer's medical purchases; amount in a consumer's HSA; length of time consumer has been on a medication; availability of alternate treatments and alternate medication with respect to a consumer's current treatments and medication; cost of one or more medicines used by the consumer, consumer demographic information; consumer product purchase data; consumer brand purchase data; frequency of consumer purchases of specific or categories of products, brands, or medicines; consumer demographic data; consumer associated pharmacists or pharmacies; consumer associated physicians or health care facilities; consumer insurance payment information; consumer insurance reimbursement information; medical insurance payment or reimbursement amount; pharmacy contact information; doctor contact information; insurance discount information; product instructions; and product safety information; transaction terminal ID, and retail store ID.

Consumer purchase transaction data record, in this application, also means consumer purchase transaction data associated with a single purchase transaction. Use of the defined term "consumer purchase transaction data record" is intended herein to clarify reference to data relating to a single purchase transaction. It is not intended to limit the scope of protection to those instances in which consumer purchase transaction data is recorded on a physical medium.

Consumer purchase transaction ID, in this application, refers to an identification assigned to a consumer purchase transaction. Preferably, the consumer purchase transaction ID is unique amongst an associated set of consumer purchase transactions.

Purchase incentive offer mean an offer of a reward conditioned on a specified purchase. For example, an offer to a consumer to provide to the consumer certain property, a coupon, a rebate, currency, or to make a donation to an account of a specified entity, if the consumer purchases a specified item of a specified product, is a purchase incentive offer.

A reward means transfer of ownership in property, a coupon, a rebate, currency, or a donation to an account of a specified entity. For example, a donation to an HSA account may be a reward specified by a purchase incentive offer.

Criteria

Transaction trigger criteria is a specification of values or combinations of values that may exist in consumer records, such as consumer purchase transaction data records. Transaction trigger criteria include multiple transactions trigger criteria and individual transaction trigger criteria.

Multiple transactions trigger criteria specify a one or more sets of data values that may exist in a plurality of consumer transaction data records.

Individual transaction trigger criteria is a specification of values or combinations of values that may exist in a single consumer record, such as a consumer transaction data record. In other words, individual transaction trigger criteria define data values that may exist in data relating to a single consumer. Individual transaction trigger criteria may include the existence or lack of existence of one or more data values in a specified range or category of data existing in the consumer purchase transaction data record.

Response

A response to criteria means an action that occurs when a CS determines that certain data meets certain criteria.

A transaction trigger response is a response generated by a CS when the CS determines that certain data meet transaction trigger criteria.

Transaction trigger responses may specify entity related actions, a purchase incentive offer, a donation to an HSA account, and an advertisement. The transaction trigger responses may also include instructions for the storage, transmission, and display of the entity related actions. In addition, a transaction trigger response may include determination of a reward. In addition, a transaction trigger response may include the determination that a consumer has purchased a product that is QME and notification of a consumer that the consumer has purchased the product that is a QME.

Examples of Criteria

Individual transaction trigger criteria may specify the existence of lack of existence individually, or in combination, of individual values or a range of values for one or more of: CID; product identifier; coupon identifier. For an example of the existence of a data value in a specified range or category, individual transaction trigger criteria may specify the existence in an consumer purchase transaction data of an individual transaction including a UPC in a range of UPC code values. As another example, individual transaction trigger data may specify the existence in a consumer purchase transaction data record of data identifying purchase of a product item associated with a food category, such as brand, manufacturer, dairy, meat, or packaged good, or a cost of a product item in a cost range, or of data specifying transaction cost within a transaction cost range.

Multiple transactions trigger data may specify the existence in a plurality of consumer purchase transaction data records of both (1) purchase or lack of purchase of specified products over a plurality of individual transactions in a specified time period, such as the immediately prior day, week, month, or a specified prior time period ending prior to the current time and (2) the same CID. Thus, in this example, multiple transactions trigger criteria, are only satisfied when consumer purchase transactions storing the same CID and also meeting the specified purchase or lack of purchase requirements exist. In this example, a multiple transactions trigger criteria response would likely include storing or transmission of the aforementioned CID. In this example, the multiple transactions trigger criteria response may also include updating counters associated with the aforementioned CID, with the specified products, or with both.

Examples of Responses to Criteria

A transaction trigger response may include transmission of print instructions to a printer or transmission of display instructions to a display device. In addition, a transaction trigger response may include determination of a reward. In addition, a transaction trigger response may include the storage or the logging of the foregoing transmitted and stored data. In addition, a transaction trigger data response may include updating of counters specifying a number of rewards, and it may include the transmission and storing of the updated counter information.

Stores

Pharmacy, as defined in this application, is a place where medicines are compounded and drug prescriptions are prepared.

Retail store, in this application, refers to a store from which products and services, which may include medicines, are ordered by consumers.

Local retail store, in this application, refers to a physical store in which products and services, including medicines, are ordered by consumers and at which those products are physically received up by consumers.

Online retail store, in this application, refers to a store from which products and services can be ordered by a consumer transmitting signals over a wide area network, such as the Internet, and which retail store retail store then delivers to an address for the consumer the ordered items.

Products and services include medicine, medical supplies, and medical services

Computer Systems (CSs)

A POS is the location where a consumer engages in transactions with a store.

A POS terminal, in this application, means an input output device for inputting and outputting information at a POS.

A POS CS, in this application, refers a CS designed to log transaction data entered at one or more POSs of a retail store.

A POS system may also be designed or programmed to provide for display and printing of transaction data at the POS where the transaction takes place, to generate reports identifying sales, accounting, and inventory, and to communicate data obtained from POS and reports to other CSs, and receive data and instructions from other CSs.

A central CS, in this application, refers to a CS which can receive transaction data from a plurality of POS CSs and transmit data back to each of those POS CSs.

Objects of the Invention

It is an object of this invention to promote consumer health by facilitating funding, disbursing, and managing accounts having some form of tax preferential status.

It is another object to facilitate funding and disbursing funds from consumers' HSAs.

It is another object of the invention to facilitate consumers' enrollment, management and use of HDHP's & HSA's.

Brief Summary of the Invention

These and other objects are provided by novel network CSs and methods of their use in which the network CS includes at least two CSs that communicate transaction data and store and run either (1) criteria and optionally additional rules facilitating consumer HSA (or some other personal account having tax preferential status) and other consumer accounts funding based upon consumer transaction data or (2) criteria and optionally additional rules allocating disbursement for a consumer's purchases between HSA (or some other personal account having tax preferential status) and other accounts, or store and run both (1) and (2). The network CS also stores the balances of the HSA and other involved accounts, and may limit funding of a consumer's HSA by implementing rules related to funding limitations (imposed by law or specified by the corresponding consumer). The novel CS may also fund or disburse funds from other consumer accounts by an amount preferably corresponding to the amount of a limitation when rules limit the funding or disbursing of funds of the consumer's HSA account by a determined amount.

As to funding HSAs, the network CS may determine from stored criteria whether to fund a consumer's HSA in response to consumer transaction data meeting a HSA sponsor's donation criteria, or meeting HSA sponsor's donation and limitation criteria.

As to disbursing funds in HSAs, the network CS may determine from the consumer's HSA account balance and product item specifications of items purchased by the consumer indicating whether the consumer's purchased items are QMEs how to allocate payment for a consumer's QMEs between the consumer's HSA account and the consumer's non HSA accounts (credit and equity accounts with credit card companies, banks, and other financial institutions). This determination is enabled (1) by associating with product identifiers an indication whether they identify a QME product and storing the QME product information for products purchase by the consumer with the transaction data for the consumer's purchases. Allocation of costs for purchases between the consumer's HSA and non HSA accounts is enables by storing either a common consumer identification associated with both accounts or storing an association of the identification of one account with the association of the other account. From that data, the network CS can implement in code rules that allocate disbursements between the consumer's accounts for the costs of the consumer's purchases based upon the QME costs, the non QME costs, legal rules applicable to the consumer's HSA, and any optional additional consumer imposed rules, to comply with the legal rules and consumer imposed additional rules regarding disbursements.

Preferably, the novel network includes a plurality of computer, each performing some of the steps accomplishing the methods noted above, and also including transmission there between of the data necessary to accomplish those steps as further described herein below.

Regarding funding HSAs, preferably, a central CS receives consumer purchase transaction data records for consumers' purchases occurring at POSs in POS CSs, stores consumer data that preferably includes the data from consumer purchase transaction data records, applies transaction trigger criteria to consumers' data records, and generates transaction trigger responses when a consumer's data record satisfy the transaction trigger criteria. The criteria stored by the central CS includes at least one HSA transaction trigger criteria and associated HSA transaction trigger response, wherein the HSA transaction trigger response includes an instruction to fund an HSA account.

Preferably, the network CS stores at the central CS sponsor accounts including at least one HSA sponsor account and consumers' HSA accounts.

Preferably, the network CS (whether at the central CS or another CS) may include another CS other than the central CS that stores a consumer's credit or bank account balances, such as a credit card company or bank CS.

Regarding disbursing funds from consumers' HSA (or other tax preferential) accounts, preferably one or more of a central CS and a bank or credit card company CS receive and store transaction data for consumer transactions at POSs in POS CSs, which transaction data includes information on costs to the consumers of QME products and non QME products, transmits that data there between as needed to determine allocation of disbursements from the consumers' accounts, and disburses funds from the consumer's HSA or other accounts (by updating balances and optionally contingent balances) according to implementation of those rules.

HSA and Other Account Funding—Donation Transaction Trigger Criteria

Preferably, the central CS associates the HSA sponsor's account with certain HSA donation transaction trigger criteria that can result in a HSA donation when the criteria is applied to data. In response to the central CS determining that HSA donation transaction trigger criteria associated with the HSA sponsor's account are met by consumer data (subject to any limitations imposed resulting from limitation criteria), the central CS credits corresponding HSA account or accounts by specified donation amounts. The central CS also debits the corresponding HSA sponsor's account, or if there are multiple sponsor's sharing costs of certain donations, debits each of the corresponding HSA sponsors accounts by a certain amount. The debit amounts preferably equal at least the costs of the donations. The debit amounts may include an additional amount credited to an account associated with the central CS (and an entity controlling the central CS).

The central CS and the entity controlling the central CS may be legally entitled to hold funds in trust, qualifying as a bank for actual funds accounts. However, as now contemplated, the central CS would not act in an official capacity to hold funds in trust for other entities. Instead, it would maintain accounting information and the central CS or the entity controlling the central CS would transmit to the legal entities mentioned herein accounts information specifying banking transfers between the bank accounts of the corresponding legal entities. Alternatively, the CS might send the accounts transfer specifications directly to trust institutions in instances in which the legal entities involved had contractually authorized the entity owning the central CS to do so.

Transaction Trigger Criteria

Purchase incentive offer transaction trigger criteria include any criteria based upon consumer purchase transaction data, demographic data, and any other data stored in association with a CID. Note specifically that purchase incentive offer transaction trigger criteria includes drug and pharmacy purchase transaction information.

HSA donation transaction trigger criteria can include the same criteria as purchase incentive offer transaction trigger criteria. In some embodiments, HSA donation transaction trigger criteria is based upon the following data types also included as consumer purchase transaction data: (1) brand of medication; (2) type of medication; (3) NDC; (4) amount of a consumer's medical purchases; (5) amount in a consumer's HSA; (6) length of time consumer has been a medication; (7) availability of alternate treatments and alternate medication with respect to a consumer's current treatments and medication; (8) cost of one or more medicines used by the consumer, (9) consumer demographic information; (10) consumer product purchase data; (11) consumer brand purchase data; (12) frequency of consumer purchases of specific or categories of products, brands, or medicines; (12) demographic data; (13) pharmacist; (14) physician; (15) new prescription; (16) refillable or non-refillable prescription; and (17) specific refill number of a refillable prescription.

In addition, HSA donation criteria may specify that HSA donations be sequential (every second, third, fourth, etc. CID identifier at a POS terminal or in a retailer POS system), random (randomly distribute HSA incentive amount to CIDs), limited to only those having a frequent shopper account or identification for a retail store, a store within region, an address within a region or a postal code, transaction in a specified retail chain store, pharmacy, or transaction with an online retail store.

The HSA donation transaction trigger criteria may require a current purchase of a specified item or items. The HSA donation transaction trigger criteria may instead or in addition, require a consumer's current purchase data to include data specify redemption of a coupon or voucher. The coupon or voucher may specify via a CID or HSA identifier stored in or associated with the coupon or voucher or the CID of the consumer an HSA donation to the HSA account of either the consumer presenting the coupon or voucher or to the HSA account of someone other than the consumer presenting the coupon or voucher.

Preferably, the central CS stores a correspondence, a link, between CIDs and corresponding HSA identifiers that correspond to an identification of the same person. This correspondence enables the central CS to associate a consumer's transaction data records associated with a CID to a corresponding HSA account.

Preferably, the central CS stores opt-in data in association with each CID or HSA identifier, indicating that the corresponding consumer has consented to having their HSA funded by donations by HSA sponsors, whether the consumer has a preferred shopper account with a retailer, and like opt in and opt out information.

HSA Funding—Limitation Criteria

Preferably, the central CS also applies limitation criteria to the same transaction data to which it applies HSA sponsor criteria. The limitation criteria may preclude or limit a HSA sponsor's donation to a consumer's HSA in certain circumstances, and it may preclude or limit the incentive value of a purchase transaction incentive offer to be provided to the consumer in certain circumstances.

Limitation criteria may include the following: (1) legal limitation criteria; (2) contention limitation criteria; (3) HSA sponsor account limitation criteria; and (4) HSA sponsor incentive redemption response criteria, and (5) consumer imposed limitations criteria.

Legal limitation criteria limit the responses so that legal limitations on funding of consumers HSAs are not exceeded. These legal limitations may be a limitation on tax favored status, or a legal limit on donations in any case.

Contention limitation criteria require the existence of a response otherwise specifying both a donation by an HSA sponsor and a purchase transaction incentive offer sponsored by the same HSA sponsor as the donation. Contention limitation criteria act to limit the response in those cases by reducing the values of the donations or offers, excluding the donation or the offer, or a combination of the foregoing.

HSA sponsor account limitation criteria limit a HSA sponsor's donations when the HSA sponsor's account at the central CS falls below a specified limit, such as zero.

HSA sponsor incentive redemption response criteria specify limits on numbers and types of incentive offers and numbers of donations, and combinations of those numbers and types and donations for which an HSA sponsor is liable. The purpose of the goal of the HSA sponsor incentive redemption response criteria is to limit the consumer purchase transaction incentives sponsored by the donor so that the donor's costs for redeeming such incentives is, or does not exceed, a specified target value.

Consumer imposed limitations criteria specify limitations imposed by a consumer. For example, a consumer may impose a limit on an amount of HSA funding per time period, such as day, week, month, or year. For example, a consumer may impose a maximum limit on his or her HSA account balance.

Preferably, the central CS is programmed to generate the HSA sponsor incentive redemption response criteria based upon data stored with the central CS, such as historical incentive offer responses for the same or related products identified in purchase transaction incentive offers the HSA sponsor has authorized the central CS to provide to consumers, and a target value.

Preferably, the central CS stores consumer legal limitation opt out data indicating a consumer opts out of limiting donations to their HSA to a legal limitation amount. If so, optionally, the central CS either does not apply legal limitation criteria or does not limit donations to the consumer's HSA that would have the HSA account exceed a legal limit relating to tax favored status.

Preferably, the central CS stores in association with multiple CIDs for a single consumer for corresponding retail store chains a HSA identifier thereby enabling the central CS to aggregate and analyze transaction data for a single consumer from multiple retail store chains. The central CS may then apply the criteria specified herein to the aggregated record of data for that consumer.

Preferably, the central CS is designed to determine any legal limitations on funding of consumers' HSAs, and to include in information provided to the consumer those legal limitations. Preferably, the network CS is designed to enable the central CS to provide this additional information at the POS, via email notification or postal notification to the consumer's addresses, or via a web site accessible by the consumer. Preferably, these functions are implemented by storing legal limitation criteria and applying the legal limitation criteria to a consumer's HSAs when the consumer requests HSA account information from the central CS.

Responses—Funding the Same Person's Account and Another Person's Account

Each response may result from data identifying one CID and specify an HSA identifier for the same CID, a different CID, or a different HSA identifier. That is, a donation resulting from one person's purchase transaction may be made to either the same person's HSA or a different person's HSA. In the alternative in which a donation is to be made to someone's HSA other than the person whose CID is associated with a transaction, some CS, preferably the central CS stores an association between the two CIDs of the two different people. For example, the central CS may store an association of first and second CID in response to the person having the first CID having specified that donations resulting from their transactions should accumulate in the HSA account of the person having the second CID.

The central CS responses may include funding another account by an amount excluded from funding of an HSA account due to results of any limitation criteria. The other account may be either an account of the same consumer or another consumer, as specified by the consumer and stored as code implementing the specification. Preferably, such allocation of funds to another account (a non HSA account) results from at least one of (1) legal limitation criteria and (5) consumer imposed limitations criteria. For example of (1), when addition of funds to an HSA account of a consumer would result in a tax consequence to the consumer, the central CS may run code implementing a rule specified by the consumer resulting in the corresponding value funding another entity's HSA or non HSA account. For example of (2), when a consumer specified a HSA account maximum value and a donation would exceed that amount, the central CS may run code implementing a rule specified by the consumer resulting in the corresponding value funding another entity's HSA or non HSA account. The entity in the foregoing example may be another real person, a for profit legal entity, or a not for profit legal entity (charity).

Consumer Notification of HSA Accounting

The central CS may also transmit to the POS CS a consumer's HSA information, so that that information is available in the POS CS if the consumer requests that information from the POS CS. A POS CS may provide to a consumer their HSA account information upon request by wirelessly transmitting that information from the vicinity of a corresponding retail store, via video displays in or near the retail store, via the consumer's cell phone, hand held device, or via printers not adjacent a POS of the retail store.

POS CS

The POS CS receives at a POS consumer purchase transaction data and transmits consumer purchase transaction data records to the central CS. The POS CS may also determine whether individual consumer transaction data satisfies individual transaction trigger criteria.

Optionally, the POS CS may store all forms of consumer data, and store and run all forms of transaction trigger criteria and limitation criteria noted above for the central CS. Typically, however, each POS CS is limited in storing only that consumer purchase transaction data for transaction occurring in the set of retail stores associated with the entity owning the retail store using the aforementioned POS CS. In any case, the POS CS immediately or eventually transmits data indicating HSA donations to the central CS.

Optionally, the POS CS is programmed to provide to the central CS a correspondence between a consumer's CID and HSA if the consumer provides that information at a POS of the POS CS.

Real Time and Non Real Time Embodiments

In non real time embodiments, the central CS generates responses that specify individual purchase transaction criteria associated with a CID, and the central CS transmits that individual purchase transaction criteria to the POS CS. The POS CS runs the individual purchase transaction criteria on transaction data received from a POS.

In a real time embodiment, the POS CS runs the individual purchase transaction criteria during a transaction and generates a response that it transmits back to the POS during the transaction.

In another real time embodiment, the central CS runs individual purchase transaction criteria during a transaction and generates a response that includes a transmission of information back to the POS during the transaction such that the person involved in the transaction at a POS of the POS CS receives the information resulting from the transaction during the transaction.

In any of the foregoing embodiments, for example, the response may specify the display or print of information specifying a donation to the consumer's HSA based upon the consumer's transaction or prior transactions, the response may specify a purchase incentive offer if criteria for which is specified product purchases associated with the CID associated with the current transaction.

If the response generated by the central CS specifies a HSA donation, the central CS updates its corresponding sponsor and HSA accounts accordingly.

If the response generated by the POS CS specifies a HSA donation, the response generated at the POS CS may include immediately transmitting that information to the central CS. Alternatively, the POS CS may be programmed to transmit donation information aperiodically, or periodically, such as hourly, daily, weekly, or monthly, to the central CS so that central CS can update its accounts information.

Employer CSs, Payroll Deductions and Employer Donations

Employees may also make payroll deduction contributions to their HSAs. The central CS may also receive payroll deduction information and HSA donation information from employers of HSA employee beneficiaries, preferably directly from the employers CSs. The central CS may credit the corresponding HSAs of those employees for their payroll deduction contributions and any employer donations. The central CS may also store employer accounts and debit the employer's payments to their employees' HSAs in the corresponding employers' accounts.

Web Site and POS Consumer HSA Account Access

In one embodiment, the network CS includes a CS running web site server software that enables consumers having HSA accounts to access the information in their account, authorize payments from their accounts, and specify investment vehicles into which the funds in their accounts will be invested.

In a related embodiment, the network CS includes a CS running web site server software that enables consumers to initiate HSA accounts including specifying an HSA trustee from a list of entities qualified to be an HSA trustee for that consumer. This system includes software to enabling the CS to select from a list of potential HSA trustees with which the central CS has accounts, a set of HSA trustees to display for selection to the individual consumer based upon receipt from that consumer of one of more of identify information, employment information, location information, and HSA trustee type preference information.

The foregoing web site functionality may be provided by the central CS, or one or more additional CS's. Preferably, the CS running the web server software has a replicated database or access to the database of the central CS, of at least the information in the central CSs database relating to HSA accounts and HSA trustee accounts. In addition, the database associated with the CS running the web server software also stores in association with the HSA trustee accounts, HSA qualification criteria, such as employers for which the HSA trustee is qualified to receive payroll deductions and employer donations, and geographic qualification information such as state, county, or zip code identifications. In addition, the web server software is preferably implemented to run accounts limitation criteria to determine and flag or reject donations or debits that fail donation or debit qualification criteria, such as donations exceeding a specified tax preference limit, and credits exceeded a specified tax preference limit.

The foregoing web site can function to inform consumers connecting to that web site via a personal computer of incentive offers the consumers may receive at specified POS CSs at specified retailers. If the consumers log in using an identification that the web site's computer server system can associate with an account, the web site may provide to the consumer targeted incentive offers or specify to the consumer the availability at certain retail stores of such targeted incentive offers.

The web site may function to provide to the consumer links to vendor web sites when the customer qualifies for an incentive offer or reward sponsored or offered by that vendor.

The web site may include functionality enabling a consumer to use a personal computer to compare terms of HDHPs and HSAs, to enroll in HDHPs and HSAs if the consumer has no such accounts, and to switch between HSAs and HDHPs. To facilitate these activities, a database associated with the web site server stores HDHP and HSA enrollment rules, provisions, and may run software to update that stored information as various HDHP and HSA providers make it available.

Optionally, the network CS is designed to enable the central CS to convey to a consumer at a POS of a POS CS that consumer's HSA information, and related information such as tax favored contribution and withdrawal limitations, and HSA account transaction information.

Additional CSs

Optionally, the network CS also includes one or more of an insurance CS, a HSA trustee CS, a sponsor CS, a banking system CS network or a bank CS, credit company CS (such as a company or bank issuing credit cards), and an employer CS.

HSA Sponsor Instructions

The HSA sponsor, optionally via transmission from a HSA sponsor CS, provides to the central CS donation specifications and consumer purchase transaction incentive offer specifications. These may be in the form of criteria, as provided. If not in the form of criteria as provided, the central CS runs code that converts the received specifications to transaction trigger criteria and optionally also limitation criteria.

HSA Accounts Data Storage and Retrieval

Optionally, the HSA trustee CS logs account data for the HSA trustee's consumers' HSAs. Optionally, the central CS also stores a copy of the consumer's HSA account data. Optionally, that HSA trustee does not store in its HSA trustee CS a log of the consumer's HSA, and only the central CS stores the log of the consumer's HSA account data on behalf of that HSA trustee and that consumer.

Preferably, either or both of the central CS and the HSA trustee CS are programmed to obtain from the insurance CS HDHP plan data specifying HSA funding legal requirements, limitations, and consequences of violating the legal limitations corresponding to consumers' HSAs.

Optionally, a HSA sponsor criteria includes purchase by the consumer of a product or service produced by, distributed by, or sold by that HSA sponsor.

Optionally, a HSA sponsor criteria includes redemption by a consumer of one or more incentive offers for products produced by, distributed by, or sold by that HSA sponsor.

Alternatives Network CSs

Some of the responsibilities and corresponding actions of the HSA sponsor, the HSA trustee, and the HDHP medical insurer can be performed by one legal entity and one corresponding CS. For example, the HDHP medical insurer may also be the HSA trustee for a consumers' HSA account. Moreover, the HDHP medical insurer may offer HSA donations, and therefore it may also be a HSA sponsor.

For example, the HDHP medical insurer may offer donations or consumer purchase transaction incentives or both for products or services designed to reduce insured's medical costs or risks. For example, the HDHP medical insurer may offer donations for purchase of prescriptions for the consumer, or for purchases of health food products.

The HSA trustee may also be a bank performing the accounting and transaction between HSA sponsor and the legal entity owning the central CS.

In one alternative embodiment, the medical insurer CS performs the functions of the HSA sponsor CS and the central CS noted above, in which case no separate CS is required.

In another set of alternative embodiments, the HSA trustee CS or the HSA sponsor CS performs the functions noted above for the central CS, in which case no separate central CS is required.

Credit authorization at a POS typically involves a dial-up connection using a Plain Old Telephone Line (POT S) line since that is more secure than a TCP/IP or similar network packet communication protocol. Use of both POTS connections and more modern network protocol packet switched connections to implement aspects of the network communications described herein are within the scope contemplated by the inventor.

Disbursing Funds—HSA and Other Accounts, and Multiple CS Distributed Accounting

The network CS may automatically allocate a charges for a consumers purchase transaction between the consumer's HSA and non HSA accounts, by including (1) a determination whether each product item is a QME, (2) the cost for that item, and (3) association of an HSA account and the consumer's non HSA accounts with one another via account identifiers.

Implementing allocation typically requires sharing of information between plural CSs. Bank and credit accounts balances (equity and credit account balances) of consumers are usually stored only on the corresponding financial institution's internal CS. Financial institutions CSs typically do have access to transaction data indicating sales amounts and do not have access to transaction data identifying product items purchased by a consumer. A central CS typically does has access to transaction data indicating both product items purchased and transaction sales amounts, but does not have consumer equity and credit account balances.

Accordingly, in one embodiment, the central CS determines the total amount of a consumer's QME purchase expenses and total purchase expenses, in association with a CID for the consumer, and in association with a bank or credit company CS address, and transmits those two totals and the CID to associated bank or credit company CS. Thereafter, the bank or credit company CS determines how to allocate the QME and non QME amounts of the consumer's purchases to the consumers' accounts.

Alternatively, the bank or credit company CS may store the consumer's HSA account balance and non HSA account, receive the consumers' purchase transaction data including product identifiers, per item costs, (from the POS CS or a central CS), and determine both the amount of QME costs and non QME costs therein.

Alternatively, the central CS may instruct the bank or credit company's CS to transmit the consumer's HSA account balance, determine allocation of the consumer's QMEs to the consumer's HSA, and transmit the allocation of amount to the consumers HSA and non HSA accounts back to the bank or credit company CS. Thereafter, the bank or credit company CS updates the consumer's HSA and non HSA account balances.

Alternatively, the central CS may transmit the consumer individual consumer transaction data (including purchased product identifiers and whether each product is a QME product) to the bank or credit company CS, and then the bank or credit company CS may determine from that data received via the central CS both the total QME and how to allocate the consumer's charges to the consumer's QME and non QME account.

Alternatively, the central CS also may store the consumers HSA and bank or credit account balances, and perform the cost allocation determination. In this alternative, no separate bank or credit company CS is required in addition to a central CS. In this alternative, the central CS may be a CS run by a bank or credit company that receives customer purchase transaction data, including product identifications, from a POS CS where the transaction occurs.

In the foregoing embodiments, allocating a consumers' expenses between at least two accounts one of which is has tax preferential status, such as an HSA, has the following preferred alternatives.

Disbursing Funds—QME and Non QME Allocation Algorithms

If the QME amount in a transaction is less than the HSA balance, apply the entire QME amount to reduce the HSA balance by that amount.

If the QME amount exceeds the HSA account balance, apply the amount of QME equal to the HSA account balance to the HSA account balance (thereby reducing the HSA account balance to zero) and apply the remainder of the QME to reduce the balance of a non HSA account. Optionally, if applicable under relevant law, log the amount of QME applied to reduce the balance of a non HSA account (that is, the amount of QME provisionally applied to a non tax preferential account), and at a later when funds exist in the HSA account, deduct from the HSA account the amount of QME provisionally applied to the non tax preferential account and credit that amount back to the non tax preferential account. If funds exist in the HSA account in an amount less than the amount of QME provisionally applied to a non tax preferential account, reduce the available balance in the HSA account to zero and credit that amount of the reduction to the non HSA account and reduce the logged amount of the QME provisionally applied to a non tax preferential account by the same amount.

As with the initial determination of per transaction or total QME based upon products purchased by a consumer, the amount of QME provisionally applied to a non tax preferential account may be stored either on the central CS, the bank or credit company CS, or both, and that datum may be requested and transmitted there between as needed to accomplish the accounting determinations just noted.

Preferably, either the central CS or the bank or credit company CS logs the identification of QME product items purchased by a consumer in association with a CID for the consumer, and preferably also stores identification of which product item purchase costs were applied to the consumer's HSA.

The inventor conceives of several tax preferential accounts per consumer (there now existing in U.S. law various types of tax favored accounts) to which consumer purchases may be allocated. The inventors conceive of more than one tax preferential account associated with one another, and algorithms to allocate qualified expenses between those accounts that maximize tax benefit to the consumer. For example, the inventor conceives of allocating first to accounts that provide tax credit (write off against actual tax due), then to accounts that provide before tax effect (such as HSAs).

In some embodiments, the central CS includes one database structure or set of database structures for consumer transaction data obtained from POSs for other than pharmacy POS CSs, such as POS systems logging data for consumer purchases of packaged goods other than pharmacy prescriptions. In these database structures, transaction data stored by the central CS in association with a consumer ID is the same as the data logged at the POS and the consumer ID is not an encrypted version of the ID provided by the consumer at the POS. In these embodiments, the central CS includes another one or set of database structures that store data derived from actual transaction data obtained from pharmacy management CSs. The data obtained from pharmacy management CSs may be generated by the pharmacy management CS by de-identifying actual consumer transaction data and generating an encrypting PID based upon the PID obtained from a patient at a POS by a pharmacy. In these embodiments, a pharmacy management CS, which is a specialized version of a POS CS, specialized for use by a pharmacy, encrypts a consumer ID and generated the de-identified data, and transmits that data to the central CS. The pharmacy management CS employs an encryption algorithm that generates the same encrypted PID for a customer ID each time the customer ID is presented. Therefore, the central CS may store a historical record of individual transactions data in association with an encrypted PID for a patient.

In some embodiments, credit and debit card company CSs provide reconciliation of data, which reconciliation may occur during transactions, substantially in real time. In these embodiments, the card company databases store related NDC & UPC identifications amongst other data, enabling real time debit and credit approval and also reconciliation of real-time QME data against HSA account information and/or against HDHP authorizations and HSAs.

Aspects of the Invention

One aspect provides a system and method for using a network computer system comprising: storing in a central CS sponsor accounts data, including at least one HSA sponsor account, in which said at least one HSA sponsor account includes sponsor identification and an account amount; receiving at said central CS consumer purchase transaction data records from a POS CS; applying criteria at said central CS including at least transaction trigger criteria to consumer data records including at least said consumer purchase transaction data records thereby generating transaction trigger responses when said consumer data records satisfy said transaction trigger criteria; and updating HSA account data and sponsor accounts data stored in a database controlled by said central CS 10 to reflect transactions specified by said transaction trigger responses.

Another aspect provides a system and method for using a network computer system comprising: a central CS; a central CS database controlled by said central CS; wherein said central CS database stores: sponsor accounts data, including at least one HSA sponsor account, and wherein said at least one HSA sponsor account includes sponsor identifications and an account amount; consumer purchase transaction data records from a POS CS; criteria including at least transaction trigger criteria applicable to consumer data records including at least said consumer purchase transaction data records, wherein application of said criteria to said consumer data records generates transaction trigger responses when said consumer data records satisfy said transaction trigger criteria; and wherein said central CS is programmed to update HSA account data and sponsor accounts data stored in said central database to reflect transactions specified by said transaction trigger responses.

Another aspect provides a system and method for using a network computer system comprising: a plurality of POS CSs; a central CS; one or more databases storing HSA accounts, said HSA accounts including HSA account identifications and HSA account amounts, and consumer purchase transaction data records generated by POS transactions in said plurality of POS CSs, said consumer purchase transaction data records including product identification codes of products purchased in corresponding transactions, each one of said consumer purchase transaction data records associated with an identifier that is the same as or associated with an HSA account identifier, and each of said product identification codes associated with an indication whether the corresponding product is a QME; and code for determining QME amounts associated with said consumer purchase transaction data records and updating said HSA account amounts based at least in part upon said QME amounts.

Related aspects include a system and method for using a network computer system including any one of the following structures or steps or features: wherein said transaction trigger responses comprise a first transaction trigger response specifying a reduced donation amount reduced by limitation criteria by a limitation amount, and, as part of said first transaction trigger response, funding both an HSA by said reduced donation amount and funding another account by said limitation amount; further comprising disbursing funds from accounts associated with a CID in response to receipt of charges associated with said CID, said disbursing comprising determining a QME amount of said charges, and applying at least a fraction of said QME amount to a first HSA account associate with said CID; further comprising applying a fraction of said QME amount a second account other than said first HSA account; further comprising re-allocating certain QME charges from said second account to said HSA account after initially allocating said certain QME charges to said second account; wherein said re-allocating occurs at a time when sufficient funds exist in the first HSA account to cover said certain QME charges; wherein said updating includes crediting an HSA account associated with a first CID by a first donation amount, and further comprising transmitting from said central CS 10 to said POS CS a first individual transaction trigger criteria; wherein said first individual transaction trigger criteria includes in association with said first CID said first donation amount; printing at a printer at a POS said first donation amount when a POS terminal of said POS CS recognizes said first CID transmitted from said POS terminal, thereby providing to said consumer notification of said donation; wherein said transaction trigger criteria comprises criteria specifying rewards including both product purchase incentive offers and HSA account donations; wherein said applying criteria further comprises applying limitation criteria to limit transaction trigger responses when said consumer data records satisfy said transaction trigger criteria; wherein said limitation criteria comprises legal limitation criteria; wherein said limitation criteria comprises contention limitation criteria; wherein said limitation criteria comprises HSA sponsor account limitation criteria; further comprising determining an amount of donation limited by said limitation criteria, and funding another account by the amount of the limitation on the donation; further comprising said central CS generating HSA sponsor incentive redemption response criteria based upon data stored with the central CS and a target value; further comprising said central CS storing consumer legal limitation opt out data indicating whether a consumer opts out of limiting donations to their HSA to a legal limitation amount; further comprising said central CS storing in association with multiple CIDs for a single consumer a single HSA identifier; further comprising said central CS determining for a specified HSA identifier legal limitations on funding and transmitting said legal limitations data in response to a network address; further comprising said central CS storing in association with one another at least one CID and a corresponding HSA identifier for a consumer; further comprising said central CS storing opt-in data in association with said first CID; further comprising said POS CS determining whether individual consumer transaction data satisfies individual transaction trigger criteria; further comprising said POS CS locally storing consumer purchase transaction data, opt in data, said POS CS applying criteria including transaction trigger criteria and limitation criteria to the locally stored consumer purchase transaction data; further comprising said POS CS providing to said central CS a correspondence between a consumer's CID and HSA identifiers; further comprising said central CS running individual purchase transaction criteria during a transaction at a POS and transmitting response information back to said POS during said transaction; further comprising display or print of information at a POS; further comprising generating at a POS CS a response specifying a donation, a CID, and a sponsor, and transmitting the specification of said donation, said CID, and said sponsor to said central CS; wherein said criteria include drug and pharmacy purchase transaction information; wherein said criteria include criteria specifying an HSA donation and said criteria specifying said HSA donation includes at least one of the following: (1) brand of medication; (2) type of medication; (3) NDC; (4) amount of a consumer's medical purchases; (5) amount in a consumer's HSA; (6) length of time a consumer has been on a medication; (7) availability of alternate treatments and alternate medication with respect to a consumer's current treatments and medication; and (8) cost of one or more medicines used by a consumer; wherein said criteria include criteria specifying an HSA donation and said criteria specifying said HSA donation includes at least two of the following: (1) brand of medication; (2) type of medication; (3) NDC; (4) amount of a consumer's medical purchases; (5) amount in a consumer's HSA; (6) length of time a consumer has been on a medication; (7) availability of alternate treatments and alternate medication with respect to a consumer's current treatments and medication; and (8) cost of one or more medicines used by a consumer; wherein said criteria include criteria specifying an HSA donation and said criteria specifying said HSA donation includes the existence of a frequent shopper account; wherein said criteria include criteria specifying an HSA donation and said criteria specifying said HSA donation includes redemption of a coupon for a HSA donation; further comprising said central CS receiving from an employer of a consumer having an HSA account stored by said central CS one or more of employee HSA contribution amount and employer donation amount, and said central CS updating at least amount of said HSA account of said consumer to reflect said contribution amount and said donation amount; further comprising providing a web site at which consumers can manage HSA account information for HSA accounts stored by said central CS; further comprising said central CS storing CID funding specification information for donations associated with purchases by a consumer having a first CID; wherein said funding specification information for said consumer having said first CID specifies funding an HSA account of a different consumer; further comprising said central CS converting donation specifications to transaction trigger criteria and limitation criteria; or further comprising code on said central CS that applies transaction trigger criteria on consumer data records and funds associated consumer HSA accounts when said code generates a responses that specifies a donation to a corresponding HSA account.

These and other aspects are defined by the appended claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
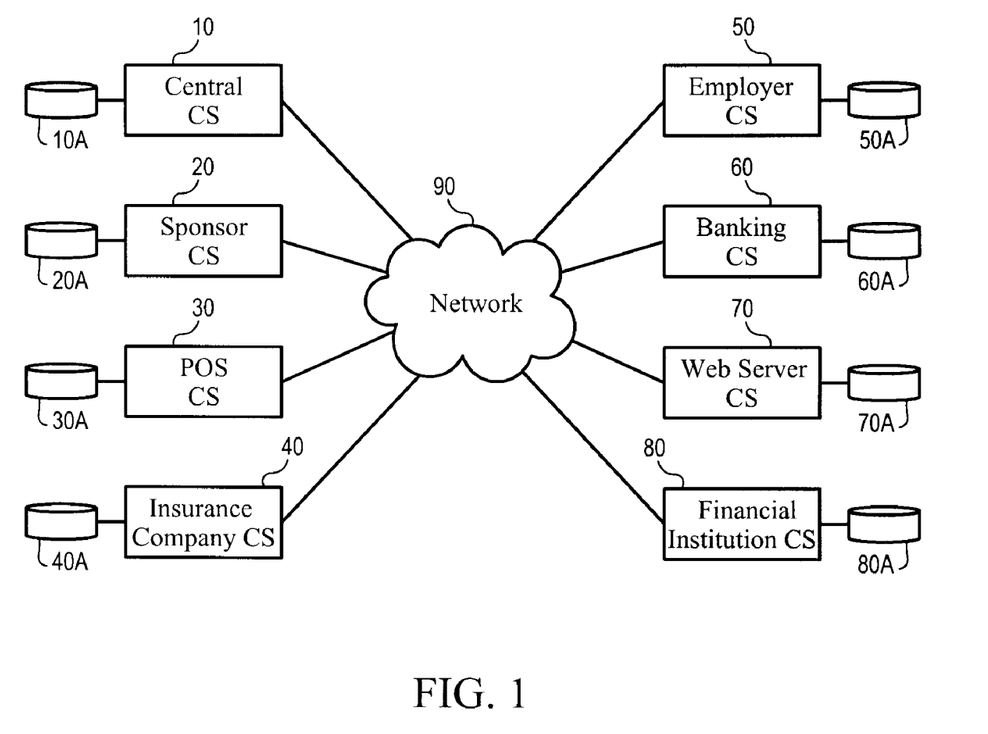
FIG. 1 is a schematic overview of novel system 1.

FIG. 1 shows an overview of the novel network CS 1. Network CS 1 includes: central CS 10; central CS database 10A; sponsor CS 20; sponsor CS database 20A; POS CS 30; POS CS database 30A; insurance company CS 40; insurance company CS database 40A; employer CS 50; employer CS database 50A; banking CS 60; banking CS database 60A; web server CS 70; web server CS database 70A; financial institution CS 80; financial institution CS database 80A; and network 90.

Each one of the CSs 10-80 includes at least one digital computer including a digital central processor unit, memory, and input and output devices.

The lines connecting elements in FIG. 1 indicate means for data transmission including wire and wireless transmission hardware, data format, and transmission protocols.

Network 90 preferably is the Internet. Alternatively, each of the CSs shown in FIG. 1 may connect to any other or all of the other CSs shown therein via private networks.

Each of the databases 10A-70A stores the data mentioned herein above for the corresponding CSs 10-70, respectively. Lines connecting databases to CSs indicate control of database read and write access by the connected CS. Codes associated with each database or associated CS provides for organization, querying, filtering, and updated of data in the database. The database structures may be relational employing flat text files, commercial relational database programs, XML database programs, or the like.

Figure 2A:
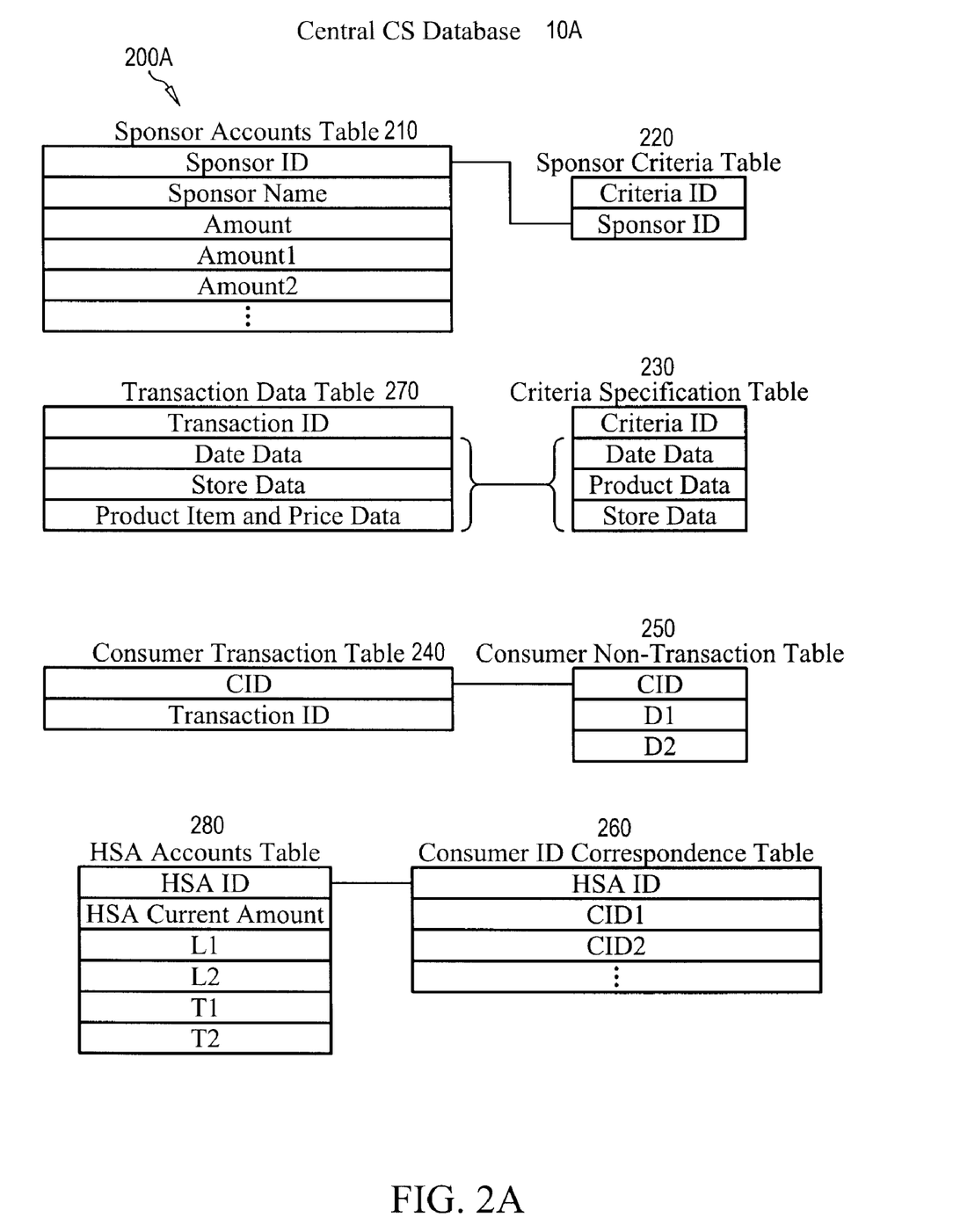
FIG. 2A is a schematic partial data structure for central CS database 10A.

FIG. 2A shows one embodiment of tables and relationships there between of a data structure storing date in central CS database 10A, data structure 200A. Lines connecting fields in different tables indicate relational database links between those fields. Data structure 200A includes tables: sponsor accounts; sponsor criteria; consumer transaction ID; consumer non-transaction data; ID correspondence table; and transaction data table. Each table is represented in conventional database field format as a set of fields, with each block representing a field, and corresponding field names are written into each block. The foregoing is a high level schema and exemplary only of one method of storing and relating data. Specifically note that "fields" described as "date data"; "store data"; and "item and price data" may in implementation represent links to additional tables or concatenated data no in third normal form and instead employing a convention for identifying concatenated data stored in one field.

Sponsor accounts table 210 includes fields sponsor ID, sponsor name, amount, amount1, amount2, amount3, etcetera. Sponsor amount may be an amount a sponsor has on account with the central CS. Sponsor amount1, amount2, etcetera, may define a total amount that a sponsor will pay for donations, total amount in the value of purchase offer incentives a sponsor will authorize, and combinations thereof, respectively.

Sponsor criteria table 220 includes fields for criteria ID and sponsor ID. Criteria ID are ID associated with each distinct set of criteria.

Criteria specification table 230 includes fields for criteria ID, one or more data fields specifying criteria applicable to date data, product data, and store data.

Consumer transaction table 240 includes fields for CID and transaction ID.

Consumer non-transaction data table 250 includes fields for CID, non transactional data fields D1, D2, etc, The D fields may include demographic and other identifying information, consumer provided preference information, and consumer provided opt in and opt out information.

Consumer ID correspondence table 260 includes fields for HSA identifier, CID1, CID2, CID3, etc. The fields in this table associate IDs for the same consumer with one another.

Transaction data table 270 includes fields for transaction ID and one or more fields for each of date data, store information, and product item and price information. Transaction data table 270 stores in association with unique transaction identifications (such as a combination of transaction ID and store ID in the store information), transaction data for all transactions provided by POS CSs to the central CS back to for example one year prior to the current date and time.

HSA accounts table 280 includes fields for HSA identifier, HSA current amount, limitation1, limitation2, etc, transaction1, transaction2, etcetera. The HSA current amount is value in the corresponding HSA account. Limitations 1, 2, etc, specify any legal limits information on tax preferred status, withdrawals and the like associated with that HSA account. Transaction1, 2, etc, specify transaction on the HSA account.

Figure 2B:
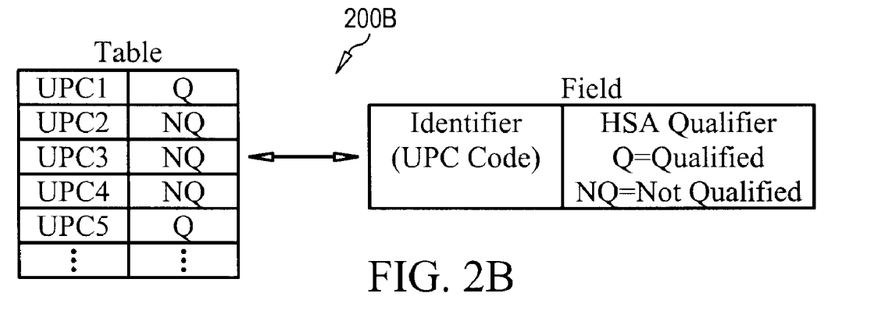
FIG. 2B is a schematic of a first embodiment of a data structure associating QME status with product identification codes for one or more of a POS, central, and financial CSs databases.

FIG. 2B schematically shows data structure 200B associating QME status with product identification codes for one or more of a POS, central, and financial CSs' databases. The left hand side of 200b shows table view listing field names UPC1 and Q representing respectively a product identification and whether the product is specified as a QME. Table view of data structure 200B includes exemplary records listing UPC1 . . . UPC4 and specifying either Q for QME or NQ for a non QME. The right hand side of FIG. 2B is a field view showing the fields in the UPC table include the UPC identifier field and the HSA qualifier field. The HSA qualifier field is where the Q or NQ is stored indicating QME or non QME status of the corresponding UPC code. In this regard, UPC is used in the general sense to refer to any specification of product identifications, such as the original UPC specification of subsequent versions of such specifications.

Figure 2C:
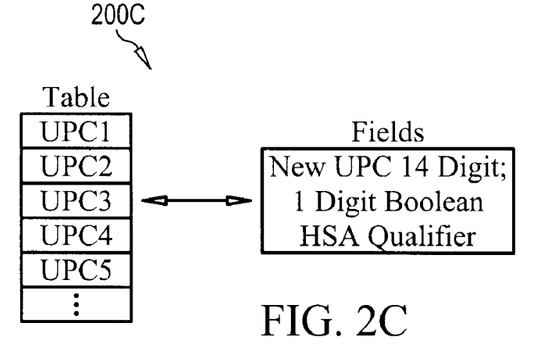
FIG. 2C is a schematic of a second embodiment of a data structure associating QME status with product identification codes for one or more of a POS, central, and financial CSs databases.

FIG. 2C schematically shows data structure 200C associating QME status with novel product identification codes for one or more of a POS, central, and financial CSs databases. The left hand side of 200C shows a table view a single column table containing product identifiers UPC1 . . . UPC4. The right hand side of 200C shows a field view indicating a single field storing a 14 digit identifier. Data structure 200C represents a novel UPC code specification in which one digit of the novel UPC code specifies whether a corresponding product is specified to be a QME.

Figure 2D:
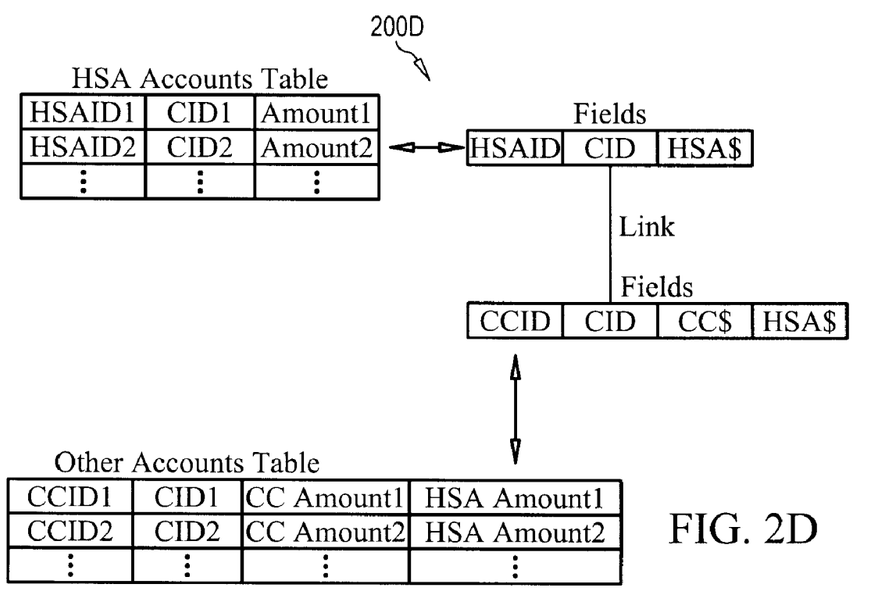
FIG. 2D is a schematic of an embodiment of a data structure linking non HSA accounts and HSA accounts via account identifiers for any one or more of a POS, central, and financial CSs databases.

FIG. 2D schematically shows data structure 200D linking non HSA accounts and HSA accounts via account identifiers for any one or more of a POS, central, and financial CSs databases. The left hand side of FIG. 2D shows data structure 200D in table view including two tables; the HSA accounts table and other accounts table. The right hand side of FIG. 2D shows data structure 200D in field view indicating that the HSA accounts table includes fields for HSA account identifier, HSAID; a CID field, CID; and an HSA account amount field, HSA$. The right hand side of data structure 200D also shows a field view indicating that the other accounts table includes fields for a credit card identification, CCID; a CID field, CID; a credit card account amount field, CC$; and a contingent HSA amount, HSA$-. The HSA$- field stores a currency value.

The contingent HSA amount, HSA$-, field, stores an amount corresponding to QME purchases not yet paid for by a consumer's HSA account. In some embodiment, the network CS determines whether the update accounts when funds do exist in a consumer's HSA account by debiting some or all of the HSA$- amount to the consumer's HSA account and crediting the consumer's other account accordingly.

Figure 3:
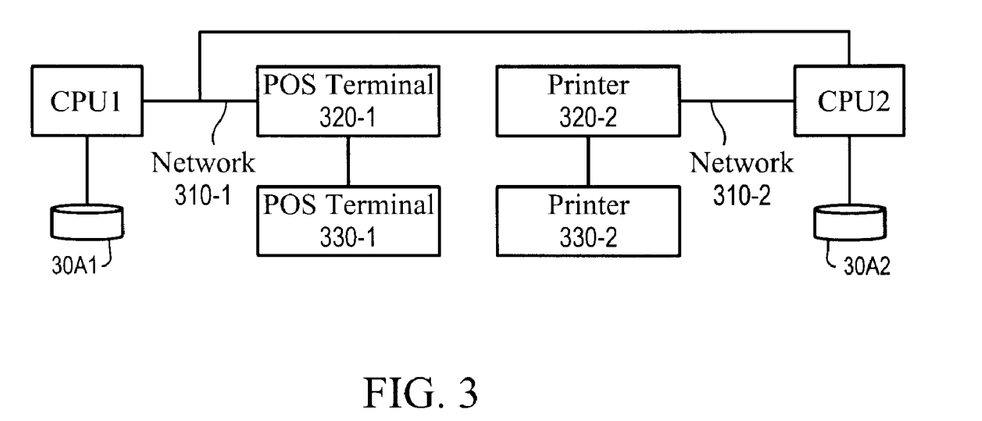
FIG. 3 is a schematic view of one embodiment of structure of POS CS 30 of FIG. 1.

FIG. 3 shows an embodiment of POS CS 30 including a first network component and a second network component. The first network components includes: CPU1; POS database 30A1; network line 310-1; POS terminal 320-1; POS terminal 330-1; and optionally additional POS terminals. Each POS terminal includes a printer for printing register receipts showing items purchase, costs, and other transaction information.

The second network component includes CPU2; POS database 30A2; network line 310-2; printer 320-1; and printer 320-2.

The first network components transmit and receive signals there between. CPU1 process and store accounting information, which may include logs of transactions, inventory, and financial accounting information.

The second network components transmit and receive signals there between. In addition, CPU2 of the second network component reads signals appearing on network line 310-1 and obtains therefrom consumer transaction records as the POS terminals transmit consumer transaction data from the POSs. CPU2 additionally runs criteria stored in POS database 30A2 against transaction data, generates responses thereto, logs the responses, and is programmed to periodically transmits logged transaction data and rewards data via network 90 to central CS 10. CPU2 stores location correspondence of printers 320-2 and 330-2 to POS terminals 320-1 and 330-1. Printer 320-2 is located at POS terminal 320-1. Printer 330-2 is located at POS terminal 330-1. The second network component typically generates responses that instructs printers 320-2 or 330-2 to print an incentive at the location of the corresponding POS terminal from which data met criteria. Generally, the print instruction and printing at printers 320-2 and 330-2 occurs during the transaction, meaning while the consumer is at the POS terminal involved in the transaction such that the consumer is likely to receive the printout generated at printers 320-2 and 330-2 resulting from that consumer's transaction at the POS.

Alternatively, all functions specified for second network component may be implemented by the first network component in which case no second network component need exist.

Figure 4:
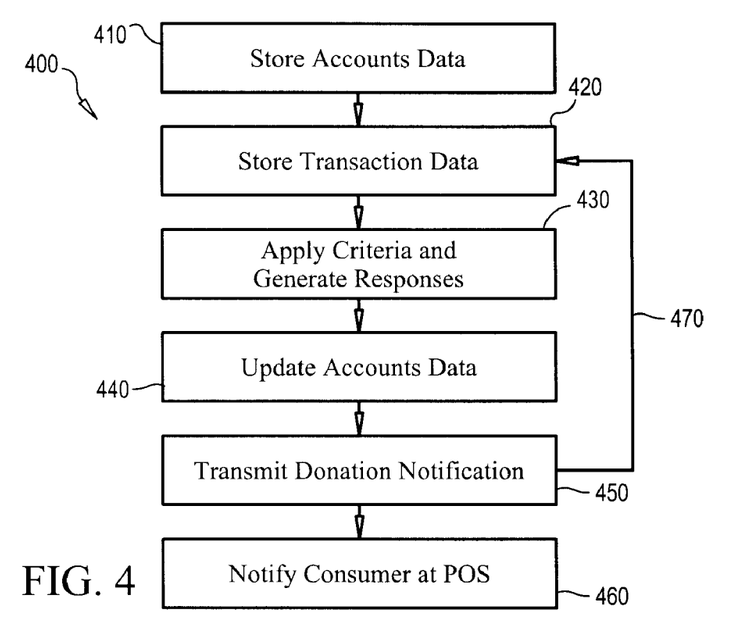
FIG. 4 is a flow chart showing a sequence of steps in implementing one embodiment of a method of using the novel network system 1 to fund inter alia an HSA account.

FIG. 4 show a flow chart 400 including major steps for using the network CS 1 for funding HSA or like accounts.

In step 410, central CS 10 stores sponsor accounts data including at least one HSA sponsor account.

In step 420, central CS 10 receives consumer purchase transaction data records from the POS CS.

In step 430, central CS 10 applies transaction trigger criteria to consumer data records and generates transaction trigger responses when the consumer data records satisfy the transaction trigger criteria.

In step 440, central CS 10 updates its HSA account data and sponsor accounts data resulting from the responses.

In step 450, central CS 10 transmits individual transaction trigger criteria to the POS CS. The individual transaction trigger criteria includes in association with the CID for a consumer that received a donation a response providing for notification to the consumer of the donation.

In step 460, the POS CS recognizes the CID for the consumer at a POS and prints a notification of the donation at a printer at the POS, thus notifying the consumer at the POS of the existence of the donation to the consumer's HSA account.

Return line 470 illustrates that the account initialization and reporting steps 410, 460, 470 are optional.

Figure 5:
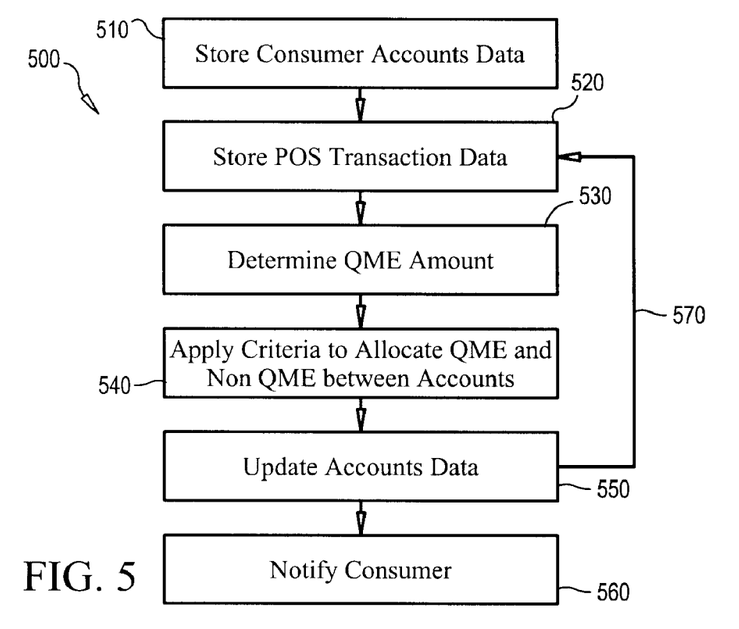
FIG. 5 is a flow chart showing a sequence of steps in implementing one embodiment of a method of using the novel network system 1 to dispense funds inter alia from an HSA account.

FIG. 5 show major steps for using the network CS 1 for dispensing funds from HSA or like accounts.

In step 510, central CS 10 stores consumer accounts data, such as HSA accounts and corresponding non HSA accounts.

In step 520, central CS 10 receives transaction data for a consumer's purchase transaction at POS in POS CS 30 via network 90 and stores that data in database 10A. This data includes at least one UPC with which there is associated an indication whether the corresponding product qualifies as a QME. The data also includes an associated CID for the consumer.

In step 530, central CS determines a QME amount for the transaction.

In step 540, central CS applies criteria and/or rules to determine allocation of the charges for the consumer's transaction to the consumer's HSA account (or other tax preferential account) and optionally another account, including any limitation criteria. It does this by associating the CID with the HSA identifier.

In step 550, central CS 10 updates the consumer's account balances based upon the results of step 540.

In step 560, central CS 10 transmit a notification of the consumer's account balances, either via web server 70 to a network address associated with the consumer to a POS CS for transmission to a terminal of the POS CS for providing the account information to the consumer when the consumer is identified as being at that terminal.

Return line 570 illustrates that the account initialization and reporting steps 510 and 560 are optional.

I claim the following:

1. A method of using a network computer system comprising:
   storing in a central CS sponsor accounts data, including at least one HSA sponsor account, in which said at least one HSA sponsor account includes sponsor identification and an account amount;
   receiving at said central CS consumer purchase transaction data records from a POS CS;
   applying criteria at said central CS including at least transaction trigger criteria to consumer data records including at least said consumer purchase transaction data records thereby generating transaction trigger responses when said consumer data records satisfy said transaction trigger criteria; and
   updating HSA account data and sponsor accounts data stored in a database controlled by said central CS 10 to reflect transactions specified by said transaction trigger responses.

2. The method of claim 1 wherein said transaction trigger responses comprise a first transaction trigger response specifying a reduced donation amount reduced by limitation criteria by a limitation amount, and, as part of said first transaction trigger response, funding both an HSA by said reduced donation amount and funding another account by said limitation amount.

3. The method of claim 1 further comprising disbursing funds from accounts associated with a CID in response to receipt of charges associated with said CID, said disbursing comprising determining a QME amount of said charges, and applying at least a fraction of said QME amount to a first HSA account associated with said CID.

4. The method of claim 3 further comprising applying a fraction of said QME amount a second account other than said first HSA account.

5. The method of claim 3 further comprising re-allocating certain QME charges from said second account to said HSA account after initially allocating said certain QME charges to said second account.

6. The method of claim 5 wherein said re-allocating occurs at a time when sufficient funds exist in the first HSA account to cover said certain QME charges.

7. The method of claim 1 wherein said updating includes crediting an HSA account associated with a first CID by a first donation amount, and further comprising transmitting from said central CS 10 to said POS CS a first individual transaction trigger criteria;
   wherein said first individual transaction trigger criteria includes in association with said first CID said first donation amount;
   printing at a printer at a POS said first donation amount when a POS terminal of said POS CS recognizes said first CID transmitted from said POS terminal, thereby providing to said consumer notification of said donation.

8. The method of claim 1 wherein said transaction trigger criteria comprises criteria specifying rewards including both product purchase incentive offers and HSA account donations.

9. The method of claim 1 wherein said applying criteria further comprises applying limitation criteria to limit transaction trigger responses when said consumer data records satisfy said transaction trigger criteria.

10. The method of claim 9 wherein said limitation criteria comprises legal limitation criteria.

11. The method of claim 9 wherein said limitation criteria comprises contention limitation criteria.

12. The method of claim 9 wherein said limitation criteria comprises HSA sponsor account limitation criteria.

13. The method of claim 9 wherein said limitation criteria comprises HSA sponsor incentive redemption response criteria.

14. The method of claim 9 further comprising determining an amount of donation limited by said limitation criteria, and funding another account by the amount of the limitation on the donation.

15. The method of claim 1 further comprising said central CS generating HSA sponsor incentive redemption response criteria based upon data stored with the central CS and a target value.

16. The method of claim 1 further comprising said central CS storing consumer legal limitation opt out data indicating whether a consumer opts out of limiting donations to their HSA to a legal limitation amount.

17. The method of claim 1 further comprising said central CS storing in association with multiple CIDs for a single consumer a single HSA identifier.

18. The method of claim 1 further comprising said central CS determining for a specified HSA identifier legal limitations on funding and transmitting said legal limitations data in response to a network address.

19. The method of claim 1 further comprising said central CS storing in association with one another at least one CID and a corresponding HSA identifier for a consumer.

20. The method of claim 1 further comprising said central CS storing opt-in data in association with said first CID.

21. The method of claim 1 further comprising said POS CS determining whether individual consumer transaction data satisfies individual transaction trigger criteria.

22. The method of claim 1 further comprising said POS CS locally storing consumer purchase transaction data, opt in data, said POS CS applying criteria including transaction trigger criteria and limitation criteria to the locally stored consumer purchase transaction data.

23. The method of claim 1 further comprising said POS CS providing to said central CS a correspondence between a consumer's CID and HSA identifiers.

24. The method of claim 1 further comprising said central CS running individual purchase transaction criteria during a transaction at a POS and transmitting response information back to said POS during said transaction.

25. The method of claim 1 further comprising display or print of information at a POS.

26. The method of claim 1 further comprising generating at a POS CS a response specifying a donation, a CID, and a sponsor, and transmitting the specification of said donation, said CID, and said sponsor to said central CS.

27. The method of claim 1 wherein said criteria include drug and pharmacy purchase transaction information.

28. The method of claim 1 wherein said criteria include criteria specifying an HSA donation and said criteria specifying said HSA donation includes at least one of the following: (1) brand of medication; (2) type of medication; (3) NDC; (4) amount of a consumer's medical purchases; (5) amount in a consumer's HSA; (6) length of time a consumer has been on a medication; (7) availability of alternate treatments and alternate medication with respect to a consumer's current treatments and medication; and (8) cost of one or more medicines used by a consumer.

29. The method of claim 1 wherein said criteria include criteria specifying an HSA donation and said criteria specifying said HSA donation includes at least two of the following: (1) brand of medication; (2) type of medication; (3) NDC; (4) amount of a consumer's medical purchases; (5) amount in a consumer's HSA; (6) length of time a consumer has been on a medication; (7) availability of alternate treatments and alternate medication with respect to a consumer's current treatments and medication; and (8) cost of one or more medicines used by a consumer.

30. The method of claim 1 wherein said criteria include criteria specifying an HSA donation and said criteria specifying said HSA donation includes the existence of a frequent shopper account.

31. The method of claim 1 wherein said criteria include criteria specifying an HSA donation and said criteria specifying said HSA donation includes redemption of a coupon for a HSA donation.

32. The method of claim 1 further comprising said central CS receiving from an employer of a consumer having an HSA account stored by said central CS one or more of employee HSA contribution amount and employer donation amount, and said central CS updating at least amount of said HSA account of said consumer to reflect said contribution amount and said donation amount.

33. The method of claim 1 further comprising providing a web site at which consumers can manage HSA account information for HSA accounts stored by said central CS.

34. The method of claim 1 further comprising said central CS storing CID funding specification information for donations associated with purchases by a consumer having a first CID.

35. The method of claim 34 wherein said funding specification information for said consumer having said first CID specifies funding an HSA account of a different consumer.

36. The method of claim 1 further comprising said central CS converting donation specifications to transaction trigger criteria and limitation criteria.

37. A network computer system comprising:
a central CS;
a central CS database controlled by said central CS;
wherein said central CS database stores:
sponsor accounts data, including at least one HSA sponsor account, and wherein said at least one HSA sponsor account includes sponsor identifications and an account amount;
consumer purchase transaction data records from a POS CS;
criteria including at least transaction trigger criteria applicable to consumer data records including at least said consumer purchase transaction data records, wherein application of said criteria to said consumer data records generates transaction trigger responses when said consumer data records satisfy said transaction trigger criteria; and
wherein said central CS is programmed to update HSA account data and sponsor accounts data stored in said central database to reflect transactions specified by said transaction trigger responses.

38. A network computer system comprising:
a plurality of POS CSs;
a central CS;
one or more databases storing HSA accounts, said HSA accounts including HSA account identifications and HSA account amounts, and consumer purchase transaction data records generated by POS transactions in said plurality of POS CSs, said consumer purchase transaction data records including product identification codes of products purchased in corresponding transactions, each one of said consumer purchase transaction data records associated with an identifier that is the same as or associated with an HSA account identifier, and each of said product identification codes associated with an indication whether the corresponding product is a QME; and
code for determining QME amounts associated with said consumer purchase transaction data records and updating said HSA account amounts based at least in part upon said QME amounts.

39. The system of claim 38 further comprising code on said central CS that applies transaction trigger criteria on consumer data records and funds associated consumer HSA accounts when said code generates a responses that specifies a donation to a corresponding HSA account.

* * * * *

UNITED STATES PATENT AND TRADEMARK OFFICE
CERTIFICATE OF CORRECTION

| | | |
|---|---|---|
| PATENT NO. | : 7,987,125 B2 | Page 1 of 1 |
| APPLICATION NO. | : 11/538181 | |
| DATED | : July 26, 2011 | |
| INVENTOR(S) | : Roberts | |

It is certified that error appears in the above-identified patent and that said Letters Patent is hereby corrected as shown below:

At Column 22 lines 46-48 reading:

"4. The method of claim 3 further comprising applying a fraction of said QME amount a second account other than said first HSA account."

should read:

"4. The method of claim 3 further comprising applying a fraction of said QME amount to a second account other than said first HSA account."

At Column 26 lines 7-11 reading:

"39. The system of claim 38 further comprising code on said control CS that applies transaction trigger criteria on consumer data records and funds associated consumer HSA accounts when said code generates a responses that specifics a donation to a corresponding HSA account."

should read:

"39. The system of claim 38 further comprising code on said control CS that applies transaction trigger criteria on consumer data records and funds associated consumer HSA accounts when said code generates a response that specifics a donation to a corresponding HSA account."

Signed and Sealed this
Eighteenth Day of October, 2011

David J. Kappos
*Director of the United States Patent and Trademark Office*